United States Patent
Arndt et al.

(10) Patent No.: US 8,571,476 B2
(45) Date of Patent: Oct. 29, 2013

(54) METHOD AND DEVICE FOR ELECTRONIC COMMUNICATION BETWEEN AT LEAST TWO COMMUNICATION DEVICES

(75) Inventors: Christoph Arndt, Moerlen (DE); Detlef Kuck, Inden (DE)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 12/622,953

(22) Filed: Nov. 20, 2009

(65) Prior Publication Data

US 2010/0069001 A1 Mar. 18, 2010

Related U.S. Application Data

(63) Continuation of application No. PCT/EP2008/056266, filed on May 21, 2008.

(30) Foreign Application Priority Data

May 22, 2007 (DE) .......................... 10 2007 023 728

(51) Int. Cl.
  *H04B 7/00* (2006.01)
(52) U.S. Cl.
  USPC ............... 455/41.2; 455/569.2; 455/569.1; 455/575.9; 455/345; 340/5.6; 340/426.36; 340/10.41; 340/428; 340/539.1; 307/10.2; 180/287
(58) Field of Classification Search
  USPC .............. 455/569.2, 569.1, 345, 41.2, 557, 455/422.1, 575.9; 340/5.6, 5.61, 426.36, 340/10.41, 5.7, 426.28, 428, 539.1; 307/10.2; 180/287
  See application file for complete search history.

(56) References Cited

U.S. PATENT DOCUMENTS

| | | | | | |
|---|---|---|---|---|---|
| 6,052,603 | A | * | 4/2000 | Kinzalow et al. | 455/557 |
| 6,226,529 | B1 | * | 5/2001 | Bruno et al. | 455/557 |
| 6,323,566 | B1 | * | 11/2001 | Meier | 307/10.2 |
| 6,992,565 | B1 | | 1/2006 | Giesler | |
| 7,061,368 | B2 | * | 6/2006 | Okada | 340/5.6 |
| 7,142,090 | B2 | * | 11/2006 | Ueda et al. | 340/5.61 |

(Continued)

FOREIGN PATENT DOCUMENTS

| EP | 1 049 347 A1 | 11/2000 |
|---|---|---|
| EP | 1 770 900 A1 | 4/2007 |

(Continued)

OTHER PUBLICATIONS

International Search Report dated Sep. 15, 2008, PCT/EP2008/056266 filed May 21, 2008.

(Continued)

*Primary Examiner* — April G Gonzales
(74) *Attorney, Agent, or Firm* — Jennifer M. Stec; Brooks Kushman P.C.

(57) ABSTRACT

This invention relates to a method and an apparatus for electronic communication between at least two communication devices. To allow reliable connection setup between the devices which are to be provided for communication at the same time as simple handling, a method according to the invention has the following steps: two communication devices intended for communication are associated with one another by means of a first coupling mechanism, and the communication between the mutually associated communication devices is performed by means of a second coupling mechanism, wherein the first coupling mechanism has a shorter range than the second coupling mechanism or is effected by means of physical contact between the communication devices.

20 Claims, 5 Drawing Sheets

(56) References Cited

U.S. PATENT DOCUMENTS

| | | | |
|---|---|---|---|
| 7,239,869 B2 | 7/2007 | Suenaga | |
| 7,299,076 B2 * | 11/2007 | Dunn et al. | 455/569.1 |
| 7,363,061 B2 * | 4/2008 | Kakehi | 455/569.2 |
| 7,395,052 B2 * | 7/2008 | Mitterreiter et al. | 455/414.1 |
| 7,551,066 B1 * | 6/2009 | Burger | 340/426.36 |
| 7,756,552 B2 * | 7/2010 | Haikola et al. | 455/569.2 |
| 7,944,901 B2 * | 5/2011 | Souissi et al. | 370/338 |
| 7,979,028 B2 | 7/2011 | Matsuda | |
| 8,285,341 B2 | 10/2012 | Sykora et al. | |
| 8,369,393 B2 | 2/2013 | Birmingham | |
| 2001/0023446 A1 | 9/2001 | Balogh | |
| 2002/0032048 A1 * | 3/2002 | Kitao et al. | 455/569 |
| 2002/0128882 A1 * | 9/2002 | Nakagawa et al. | 705/4 |
| 2003/0032460 A1 * | 2/2003 | Cannon et al. | 455/569 |
| 2003/0114195 A1 * | 6/2003 | Chitrapu et al. | 455/562 |
| 2003/0224805 A1 | 12/2003 | Suenaga | |
| 2004/0039505 A1 | 2/2004 | Vollmer et al. | |
| 2004/0072558 A1 | 4/2004 | Van Bosch | |
| 2004/0179512 A1 | 9/2004 | Leblanc et al. | |
| 2004/0198306 A1 * | 10/2004 | Singh et al. | 455/345 |
| 2004/0218605 A1 | 11/2004 | Gustafsson et al. | |
| 2005/0070272 A1 | 3/2005 | Marangos | |
| 2005/0288837 A1 | 12/2005 | Wiegand et al. | |
| 2006/0109107 A1 | 5/2006 | Staton et al. | |
| 2006/0116127 A1 | 6/2006 | Wilhoite et al. | |
| 2006/0143097 A1 | 6/2006 | Mitterreiter et al. | |
| 2006/0168627 A1 | 7/2006 | Zeinstra et al. | |
| 2006/0223536 A1 | 10/2006 | Chia | |
| 2006/0234769 A1 | 10/2006 | Srinivasan et al. | |
| 2007/0124058 A1 | 5/2007 | Kitagawa et al. | |
| 2007/0140187 A1 | 6/2007 | Rokusek et al. | |
| 2008/0020707 A1 * | 1/2008 | Takayama et al. | 455/41.2 |
| 2008/0200216 A1 | 8/2008 | Schwarcz | |
| 2009/0049074 A1 | 2/2009 | Dara-Abrams et al. | |
| 2009/0267774 A1 | 10/2009 | Enegren et al. | |
| 2009/0292416 A1 | 11/2009 | Ubik et al. | |
| 2009/0298474 A1 | 12/2009 | George | |
| 2010/0069001 A1 | 3/2010 | Arndt et al. | |
| 2010/0169432 A1 | 7/2010 | Santori, Jr. et al. | |
| 2010/0210211 A1 | 8/2010 | Price | |
| 2010/0210302 A1 | 8/2010 | Santori, Jr. et al. | |
| 2010/0245123 A1 | 9/2010 | Prasad et al. | |
| 2011/0306338 A1 | 12/2011 | Ozaki et al. | |

FOREIGN PATENT DOCUMENTS

| | | |
|---|---|---|
| EP | 1 188 617 B1 | 6/2008 |
| WO | 98/57824 A1 | 12/1998 |
| WO | 00/15931 A1 | 3/2000 |
| WO | 03/100739 A1 | 12/2003 |

OTHER PUBLICATIONS

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

Mah, Use your Windows Mobile smartphone as a Wi-Fi access point, TechRepublic: A ZDNet Tech Community, Feb. 9, 2010, printed Jul. 31, 2010.

Ford Sync Feature Spotlight: WiFi and Mobile Hotspot in The Car/In Telematics Today, printed from http://intelematicstoday.com, printed Jul. 31, 2010.

The Cable Guy "The Windows XP Wireless Zero Configuration Service" Microsoft TechNet, Nov. 2002.

Ricky Says, Use Your Cell Phone as a Laptop Modem (PC and Mac), http://www.rickysays.com/cell-phone-as-a-laptop-modem, pp. 1-19.

CN Office Action dated Feb. 20, 2013.

* cited by examiner

METHOD AND DEVICE FOR ELECTRONIC COMMUNICATION BETWEEN AT LEAST TWO COMMUNICATION DEVICES

CROSS-REFERENCE TO RELATED APPLICATIONS

This application is a continuation of PCT application Serial No. PCT/EP2008/056266, filed May 21, 2008, which claims priority to German Application No. 10 2007 023 728.8, filed May 22, 2007, which are hereby incorporated by reference in their entirety.

BACKGROUND

1. Technical Field

The illustrative embodiments relates to a method and an apparatus for electronic communication between at least two communication devices.

2. Background Art

In motor vehicles, mobile electronic devices of various type and purpose (mobile telephones, portable music players, navigation systems, PDAs etc.) are being used to an increasing extent. Such devices are usually equipped with an interface (e.g. BLUETOOTH, USB, WiFi) for setting up a connection to the vehicle superstructure.

The communication link using a data communication link (e.g. BLUETOOTH link) may require prior identification of the communication devices which are to be connected. Particularly when there are a plurality of active data communication devices present, it is necessary to select the devices which are to be correctly connected prior to the subsequent communication (what is known as "pairing"). In this case, setting up contacts between the devices may require a plurality of steps to be performed manually by the user prior to the start of the actual communication, particularly setting the data communication mode in the relevant communication devices, checking identification numbers and usually password input into both communication devices which are to be connected to one another.

EP 1 049 347 A1 discloses a method and an apparatus for setting up a connection between a communication devices (e.g. a mobile telephone) and an associated vehicle mounting kit using a radio link, particularly a BLUETOOTH link, in which, when the user approaches the vehicle, the vehicle mounting kit receives the radio signal from the mobile telephone without mechanical contact between the mobile telephone and the vehicle and, in the event of positive user identification, sets up the connection, after which the mobile telephone may be controlled solely by means of the vehicle mounting kit.

EP 1 188 617 A2 discloses a contactless videophone system, in which, when a portable videophone is brought into a vehicle, the videophone is wirelessly supplied with information about the system structure. The videophone takes this information as a basis for changing over the path of the audio/video data from the videophone devices, such as microphone, loudspeaker, camera and screen display, to the relevant onboard devices.

WO 00/15931 A1 discloses an electronic communication system for a vehicle with a base station, which is arranged in a vehicle, and a moving data storage medium for interchanging signals with the base station. The communication system is able to be used particularly for passive access control or passive movement control (engine immobilizer). In this system, a first capacitive coupling link is routed at least to some extent through the body of a user and a second coupling link is formed at least to some extent by the ground.

WO 98/57824 A1 discloses a motor vehicle mounting fixture for a mobile telephone which has an RF transmission/reception part, connected to an antenna, and an interface for allowing transmission of control signals between the motor vehicle mounting fixture and the mobile telephone. In this case, the RF transmission/reception part can be controlled by the mobile telephone, the signal transmission between the interface of the motor vehicle mounting fixture and the mobile telephone preferably taking place wirelessly by means of infrared.

WO 03/100739 A1 discloses a system and a method for presence analysis of objects using capacitive interaction effects and particularly for use in a motor vehicle locking system.

EP 1770900 A1 discloses a method for wireless electronic communication between a plurality of communication apparatuses, in which both a short-range first coupling, based on the transmission of electromagnetic waves, for transmitting challenge and response signals and a comparatively long-range second coupling for performing the actual data communication are used, both couplings being implemented by means of electromagnetic waves.

SUMMARY

The illustrative embodiments provide a method and an apparatus for electronic communication between at least two communication devices, which allows reliable connection setup between the devices which are to be provided for the communication while being simple to handle.

A method according to one illustrative embodiment, has the following steps:

two communication devices intended for data communication are associated with one another by means of a first coupling, and the data communication between the mutually associated communication devices is performed using a second coupling;

wherein the first coupling has a shorter range than the second coupling or is effected by means of physical contact between the communication devices, and wherein the first coupling is in the form of a capacitive coupling.

In this connection, the term "data communication" is intended to mean that it will be the interchange of the actual (user) data between the devices; this is in contrast to the communication by means of the first coupling, which may be used to exchange essentially association and protocol information.

In the context of the present application, physical contact between the communication devices is, in particular, also intended to be understood to mean contact via the body of a user (touching both devices), as will be explained in more detail below.

Illustrative embodiments are based on the principle of the association between two communication devices which are intended to communicate with one another, on the one hand, and the actual communication between these communication devices, on the other hand, being effected by means of different couplings. The coupling chosen for the association is comparatively short range. In this case, the coupling chosen for the association also particularly may include contact via the body of a user who is touching two or more communication devices.

As a result of the short range or of the contact, it is possible to make an explicit association between the communication devices which are correctly intended for this purpose, and, particularly when a plurality of suitable communication devices are present, the risk of incorrect association and the transmission of personal and/or secret data to the wrong device can be avoided. This happens without the need for further special measures from the user, in particular complex manual working through menus for selecting and associating devices with one another using passwords which need to be input, which means that the method allows simple handling, with no physical connection by means of a cable or the like being required between the devices which are to be coupled. The use of a capacitive coupling for the first coupling (which can be used to interchange particularly association and protocol information and which, unlike the second coupling, may not be intended for the interchange of the actual user data between the communication devices) has the advantage that the first coupling reacts particularly selectively to the distance between the devices to be coupled, so that in particular inadvertent coupling of unwanted devices or devices which are not meant to be associated with one another, or external tapping in the identification phase, is not possible.

The method is therefore distinguishable by maximum robustness and protection from tapping, since only the two communication devices which are connected, particularly via the person's body, interchange data and tapping is now possible only in direct contact with the relevant person and is therefore simple to check and to avoid. Furthermore, the use of a capacitive coupling for the purpose of associating two communication devices which are intended for data communication allows capacitive "pairing" to be effected explicitly and in a manner protected from tapping, particularly via the body of the user, without the need—as in the case of pairing on the basis of the interchange of electromagnetic waves, for example—for the device which is to be associated to be selected from a list by working through a plurality of menus or submenus.

In one illustrative embodiment, both the first coupling and the second coupling respectively use a wireless communication method, with a transmitted signal dropping exponentially with the distance between the devices which are to be coupled to a greater extent in the case of the first coupling than in the case of the second coupling. That is to say that a signal level $S_n$ (where n=1 for the first coupling and n=2 for the second coupling) which is transmitted between the devices on both sides decreases, in each case on the basis of the distance r between the devices which are to be coupled, approximately in line with a correlation $S_n(r)/S_n(0) \approx 1/r^{x_n}$, where $x_{1,2} \geq 1$ and $x_1 > x_2$. For radio waves, a $1/r$ signal dependency applies—at least for propagation in a vacuum—to an approximate degree, whereas in the case of capacitive coupling the signal drops exponentially at least approximately to a much greater extent, so that said signal is now indistinguishable from noise at just a relatively short distance. The result of this is that the first coupling method reacts very selectively to the distance between the devices which are to be coupled, which means that inadvertent coupling of unwanted devices or external tapping in the identification phase is not possible.

Against this background, it is conceivable in one embodiment for the devices to interchange a cryptographic key in the identification phase by means of the first coupling in a manner protected from tapping, said key then allowing secure encrypted transmission via a long-range (and therefore tappable, in principle) connection in the further course of the communication. This practice allows the connection of devices which are hitherto "unknown" to one another, which as yet have no shared cryptographic key stipulated for them, since the stipulation and interchange of a shared cryptographic key are always a particularly critical phase of radio-based data communication which can be effected with more or less protection from tapping by means of the first coupling.

In line with a further exemplary embodiment, buttons are provided on the communication devices for the purpose of making the physical contact between the communication devices. The buttons respectively have capacitive contact which allows data transmission between these communication devices on a capacitive route. In this embodiment, the contact between the communication devices is made directly by virtue of a person touching or pushing contacts on both communication devices. Pushing the contact activates the respective communication device. The first coupling can then be implemented by means of capacitive contact made on the switch surface. This type of implementation of the first coupling likewise performs capacitive data transmission and is distinguished by maximum robustness and protection from tapping. The identification of the two communication devices by means of the activating person is protected from tapping, since only the two activated communication devices connected via the person's body interchange data. "Tapping" is now possible only in direct contact with the relevant person and is therefore simple to check and to avoid.

In line with one embodiment, the first coupling is effected particularly by means of capacitive coupling, and the second coupling is effected by means of a radio link, particularly a BLUETOOTH link. It is naturally also possible to use other radio link systems such as WLAN, GSM, WiFi or else optical transmission systems (e.g. infrared transmission).

In line with one embodiment, prior to the performance of the communication between the mutually associated communication devices, the second coupling is used for identification by virtue of the transmission of at least one identification signal between the two mutually associated communication devices, which in turn is likewise effected by means of the first coupling.

In line with one embodiment, prior to the performance of the communication between the mutually associated communication devices, the second coupling is used to transmit a profile which is characteristic of the second coupling between the two mutually associated communication devices, which in turn is likewise effected by means of the first coupling.

Even if,—as explained above—the first coupling can be used to interchange data for the purposes of identifying the devices or for the purpose of agreeing a cryptographic key, it is also entirely conceivable, within the present context, to keep the communication by means of the first coupling as simple as possible, so that unidirectional data interchange may also suffice for the appropriate coupling. By way of example, a communication devices could use this second coupling to ask, in sequential succession, all other communication devices which can be reached by means of the second coupling to send a signal by means of the first coupling. If this signal is received from the requesting communication device by means of the first coupling, the relevant device to be coupled can be explicitly identified thereby. The further communication, including the identification phase and the profile alignment, is then performed by means of the second coupling. In this situation, the first coupling can be designed to be unidirectional (the requesting communication device merely needs to be able to receive signals via the first coupling, and the other communication devices to be coupled merely need to be able to send them).

In line with one embodiment, a first communication device from the two communication devices is a mobile communication device, particularly a mobile telephone, a PDA, a portable music player or a mobile navigation system, and a second communication device from the two communication devices is provided in a motor vehicle mounting kit.

However, the invention is not limited to the applications in a motor vehicle, but rather can also be used in conjunction with any communication devices (e.g. in the case of pairing between a PDA and a mobile telephone or with headphones).

The illustrative embodiments also relate to an apparatus for electronic communication between at least two communication devices which is designed to carry out a method with the features described above.

Further refinements of the illustrative embodiments can be found in the description and in the claims.

BRIEF DESCRIPTION OF THE DRAWINGS

The invention is explained in more detail by way of example below with reference to the drawings, in which.

DETAILED DESCRIPTION

Figure 1:
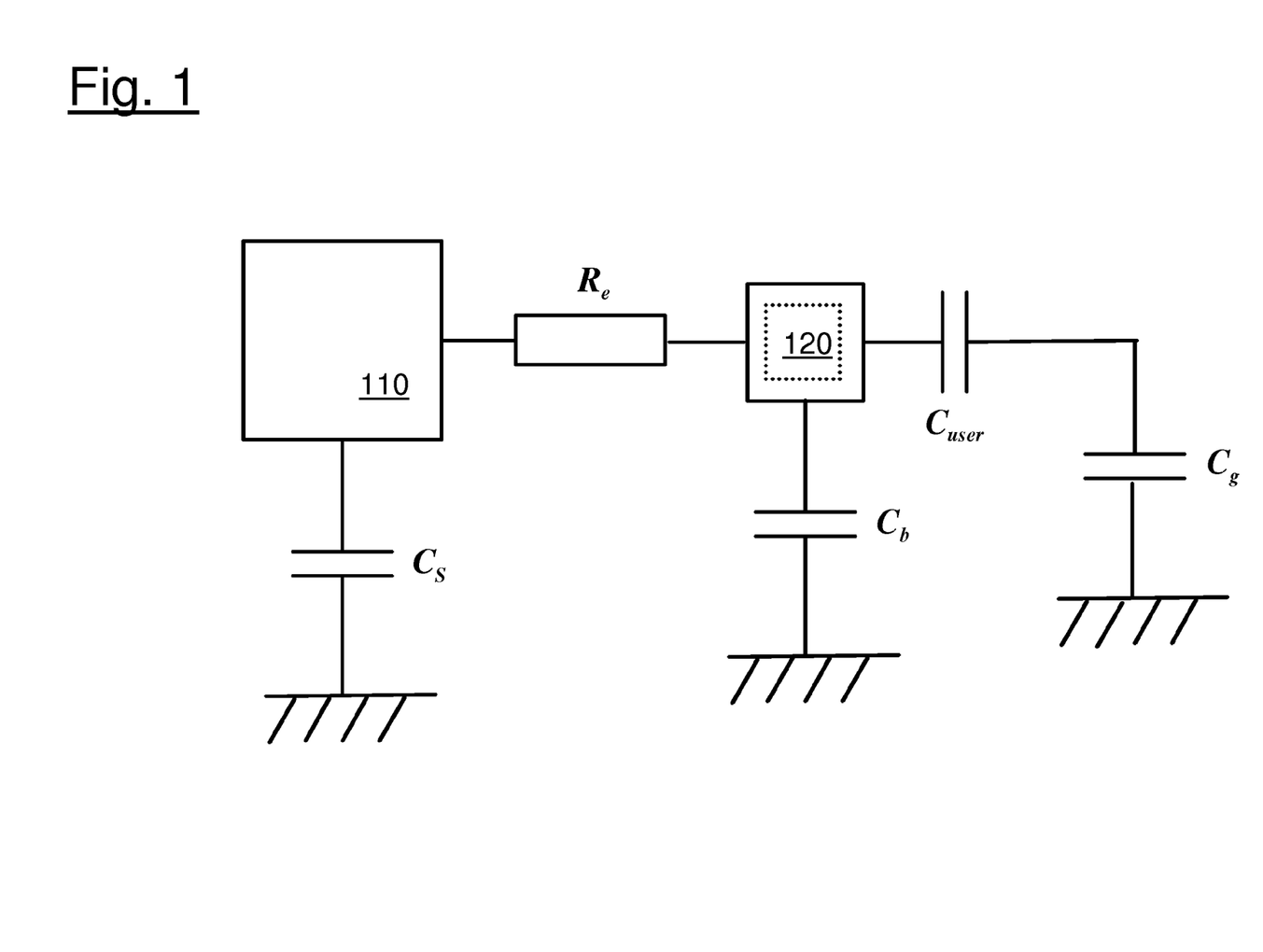
FIG. 1 shows a block diagram illustrating an exemplary association between two communication devices.

FIG. 1 will first of all be used to provide a basic explanation of how the illustrative embodiments make the association between two communication devices intended to communicate with one another using a short-range coupling, specifically on the basis of the exemplary embodiment using capacitive coupling. In FIG. 1, 110 denotes a capacitance sensor circuit (in the form of an integrated circuit element, IC) which is electrically connected to an electrode 120, wherein the reference resistor situated between the sensor 110 and electrode 120 is denoted by R the capacitance of the electrode 120 with reference to ground potential is denoted by $C_b$ and the capacitance of the capacitance sensor 110 with reference to ground potential is denoted by $C_s$. The capacitance sensor circuit 110 and the electrode 120 are associated with a first communication device (not shown in FIG. 1) which may be provided on a vehicle superstructure, for example. So long as there is no user engaging in the system or approaching the electrode 120, the following reference value can be defined:

$$\text{Reference\_value} = k \cdot \frac{C_s}{C_b} \quad (1)$$

wherein the factor k in the design from FIG. 1 is dependent on the capacitive sensor 110 and on the reference resistor $R_e$. If, in the arrangement from FIG. 1, $C_g$ is also used to denote the capacitance of the link from the user to ground potential and $C_{user}$ is used to denote the total capacitance of the user, the following relationship first of all applies approximately to the total capacitance of the user $C_{user}$:

$$\frac{1}{C_{user\_all}} = \frac{1}{C_{user}} + \frac{1}{C_g} \approx \frac{1}{C_{user}} \quad (2)$$

on the basis of $$C_{user} \ll C_g \quad (3)$$

First of all the system is calibrated without any intervention by a user. As soon as the user approaches the electrode 120, the capacitance of the user $C_{user}=C_u$ changes from the value zero to a measurable finite value, and the following is obtained $$\text{User\_value} = k \cdot \frac{C_s}{C_u + C_b} \quad (4)$$

The Detection_level corresponds to the difference between the two values, that is to say Reference_value−User_value, for which the following applies $$\begin{aligned}\text{Detection\_level} &= k \cdot \frac{C_s}{C_b} - k \cdot \frac{C_s}{C_u + C_b} \\ &= k \cdot C_s \cdot \left(\frac{1}{C_b} - \frac{1}{C_u + C_b}\right) \\ &= k \cdot C_s \cdot \left(\frac{(C_u + C_b) - C_b}{C_b \cdot (C_u + C_b)}\right) \\ &= k \cdot \frac{C_s}{C_b} \cdot \left(\frac{C_u}{C_u + C_b}\right)\end{aligned} \quad (5)$$

Figure 2:
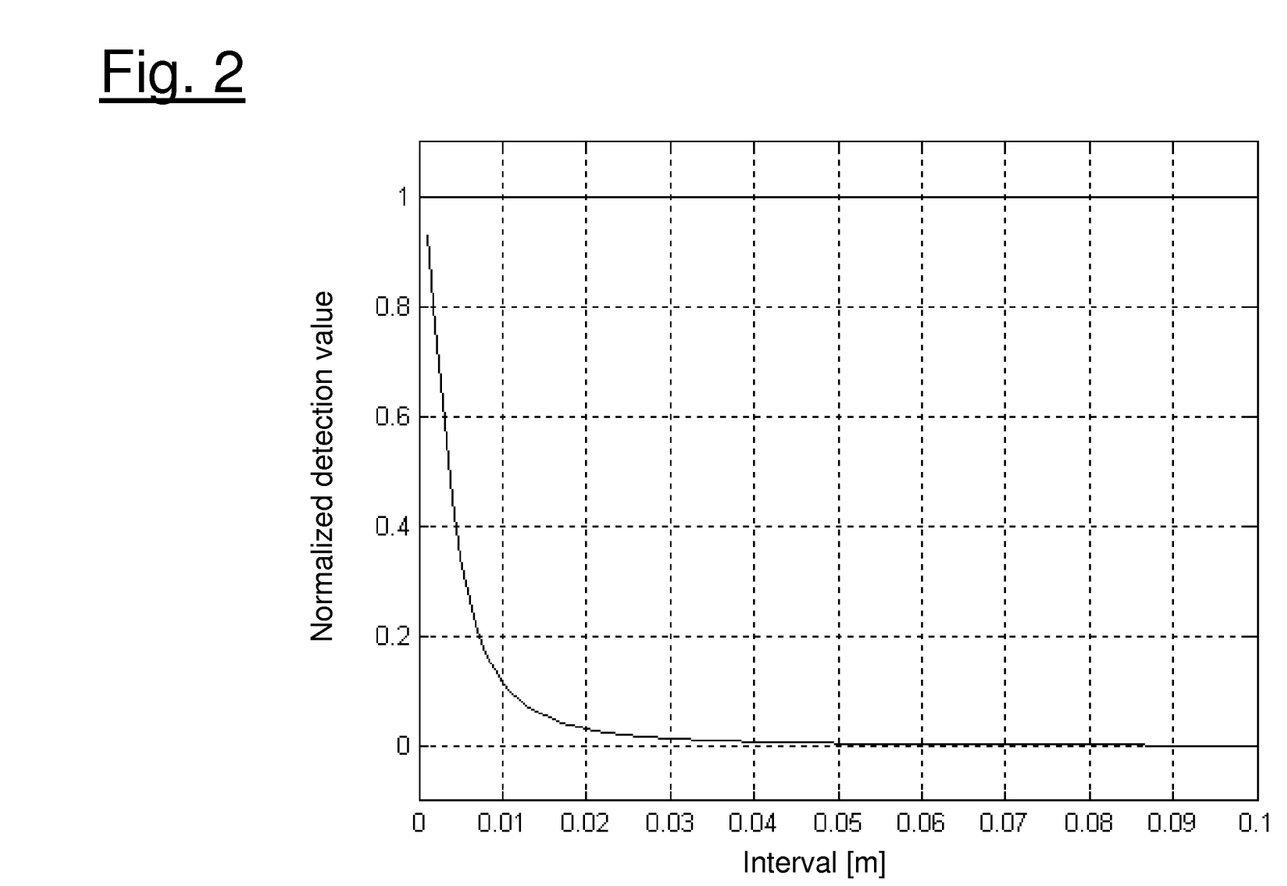
FIGS. 2-3 show exemplary graphs to explain the interval dependency of the protection level obtained with a first coupling.
Figure 3:
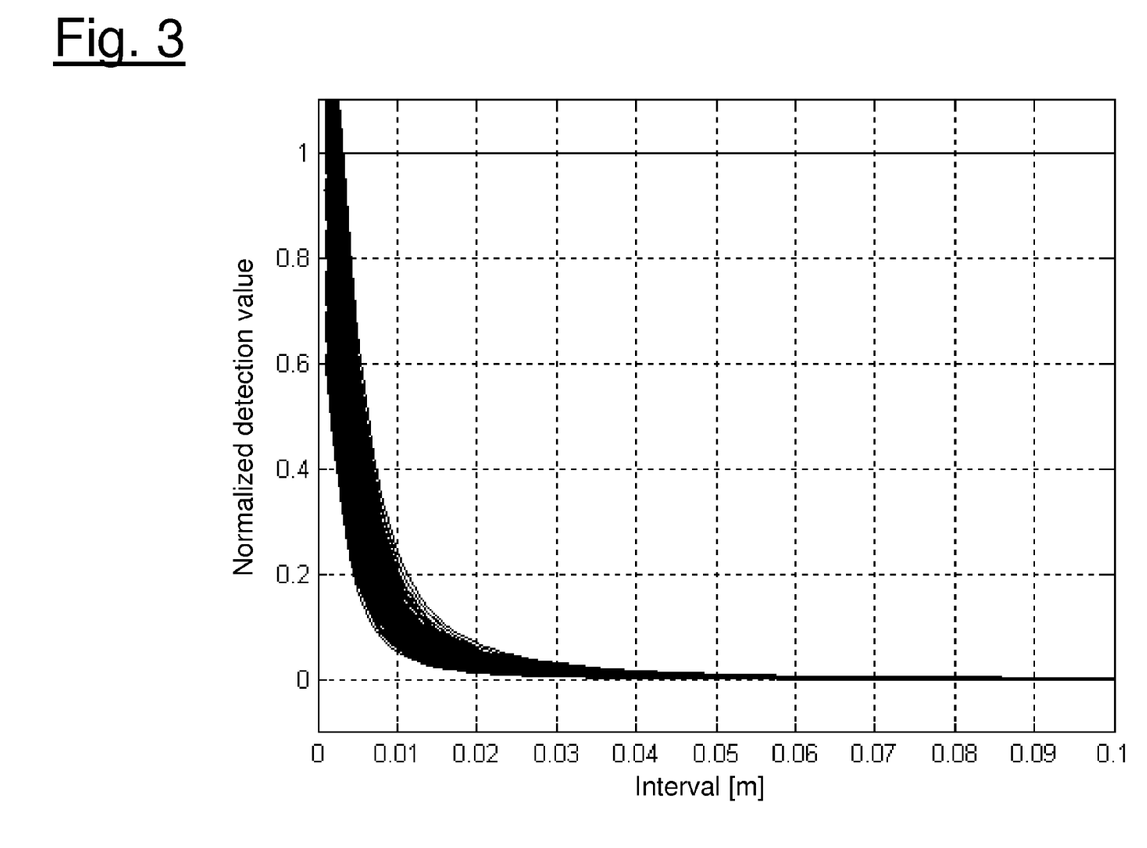

As can be seen from FIG. 2, the Detection_level drops rapidly as the interval between the user and the electrode 120 increases, with a detection level of approximately 5% in comparison with the corresponding detection level for direct contact between the user and the electrode 120 now being obtained at a distance of 4 cm, for example. This response cannot be changed significantly in FIG. 3 even when the parameters are varied (e.g. a variation of $C_s$ or $C_u$) in equation (3). For the actual communication between the communication devices, the illustrative embodiment involves the use of a data communication link (e.g. a BLUETOOTH link). In this case, in the design shown schematically in FIG. 4, the identification performed when such a data communication link is set up and the transmission of the suitable identification profile can likewise be effected by means of the capacitive coupling by using the two communication devices as transmitter/receiver of modulated signals, i.e. one device sending an encoded challenge signal and the other device sending an encoded response signal, for example.

Figure 4:
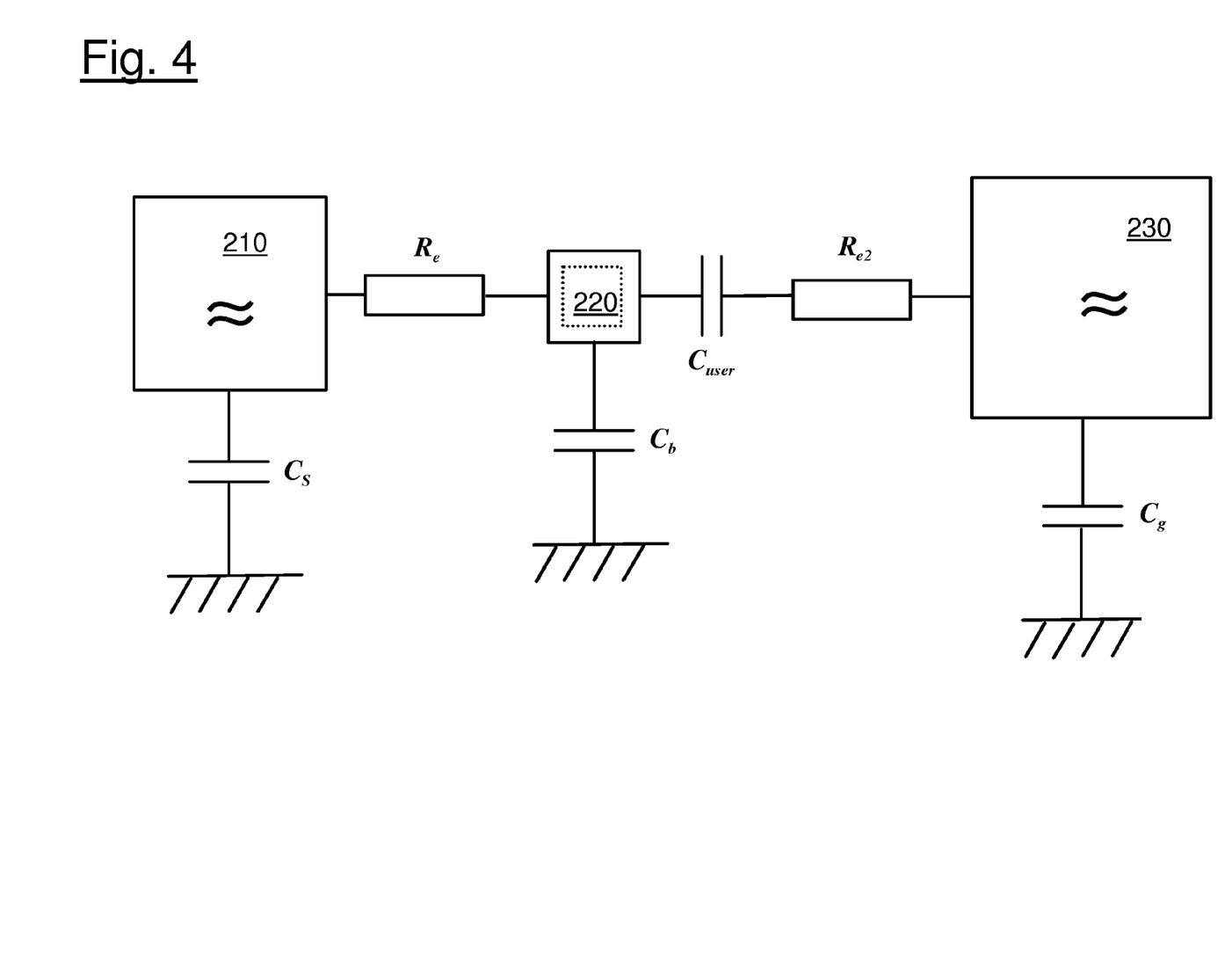
FIG. 4 shows an exemplary block diagram to explain an apparatus for electronic communication.
Figure 5:
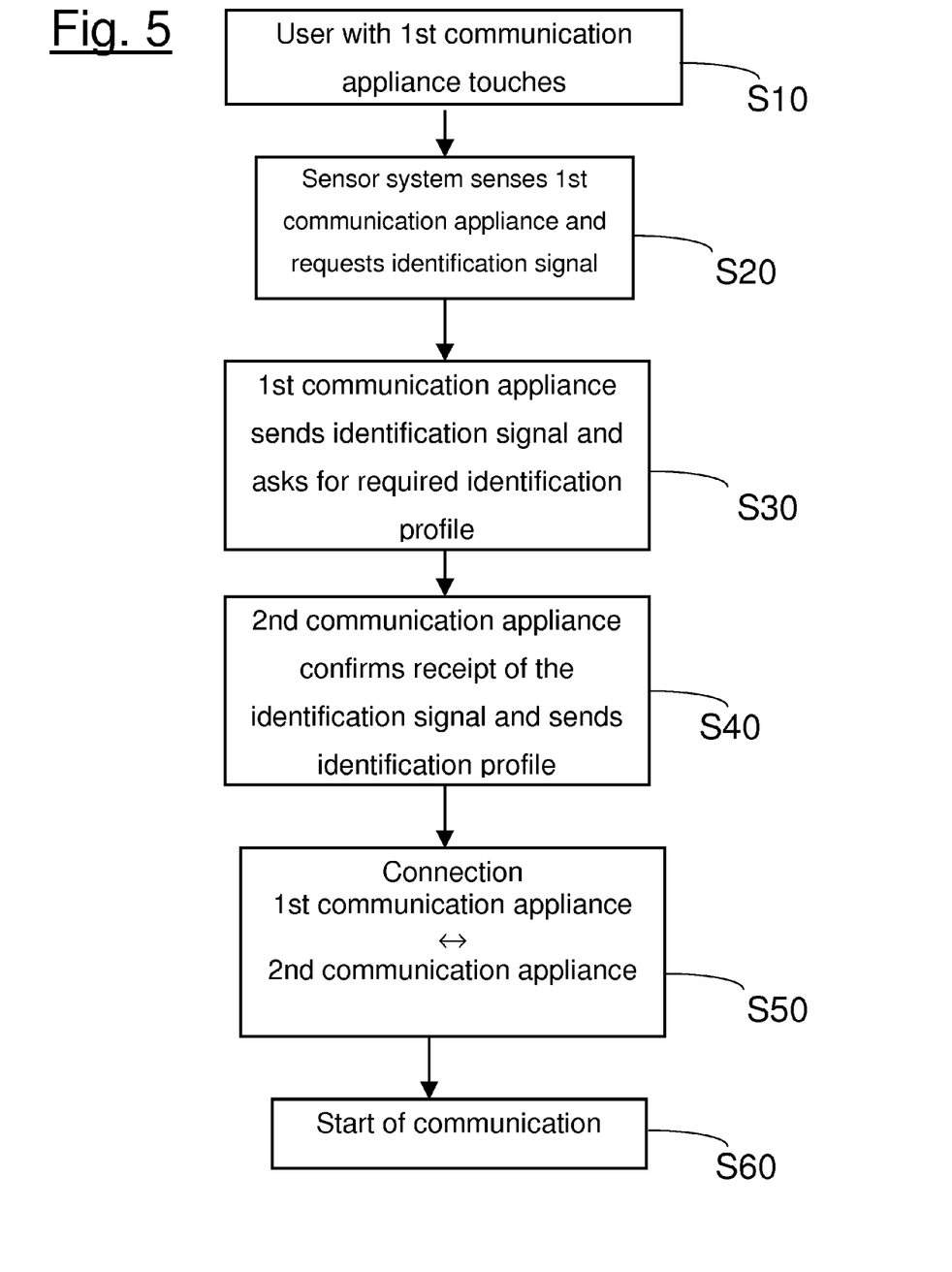
FIG. 5 shows a flowchart to explain an exemplary flow of an illustrative embodiment.

In detail, the flow of the method according to an illustrative embodiment for setting up communication between two communication device is as follows, with reference to the block diagram in FIG. 4 and on the basis of the flowchart shown in FIG. 5:

In a step S10, a user carrying a mobile communication device 230 touches a sensor, provided along the motor vehicle, for setting up a connection to a further communication device 110 provided on the vehicle superstructure. In step S20 the sensor system (i.e. the capacitance sensor 110 described with reference to FIG. 1) senses the mobile communication device 230 in physical proximity to the sensor system and asks it for an identification signal.

In an alternative embodiment of the method (not shown), it is also possible to dispense with the user first of all needing to touch a sensor in step S10 by continuously polling for the presence of a mobile communication device in the reception range of the sensor system and automatically continuing in step S30 if an appropriate device is recognized.

In step S30 the mobile communication device 230 sends an identification signal and requests the required BLUETOOTH profile. In step S40, the communication device 210 provided on the vehicle superstructure sends confirmation of receipt of the identification signal and the required identification profile. In step S50, the mobile communication device 230 is connected to the communication device 110 provided on the vehicle superstructure. In step S60, the communication begins via the data communication link.

To implement secure and robust data transmission by means of the capacitive route, it is particularly possible to use digital data transmission by means of pseudo-random sequences.

Limitation to short ranges or physical contact means that the illustrative embodiment allows explicit and specific association of the communication device with one another and also secure data transmission to be achieved. This allows explicit and specific identification in order to determine the respective correct partner device for the data interchange, and an easy-to-handle method is provided in which there is no need to go through a plurality of submenus in both communication devices.

What is claimed:

1. A computer-implemented method comprising:
   detecting a device within communication range of a wireless vehicle-based transceiver;
   establishing communication with the device over a first, wireless coupling;
   requesting identification verification from the device over the first coupling;
   receiving identification verification from the device over a second capacitive coupling responsive to the requesting; and
   utilizing the identification verification to select the device for establishment of bi-directional communication over the first coupling.

2. The method of claim 1, wherein:
   the detecting a device includes detecting a plurality of devices, wherein
   the establishing communication includes establishing communication with the plurality of devices, wherein
   the requesting identification includes requesting identification from the plurality of devices, wherein
   the receiving identification includes receiving identification from one of the plurality of devices over the second coupling, and wherein
   the utilizing the identification includes utilizing the identification to select the one of the plurality of devices for establishment of bi-directional communication over the first coupling.

3. The method of claim 1, wherein the first, wireless coupling is a BLUETOOTH coupling.

4. The method of claim 1, wherein the first, wireless coupling is a WiFi coupling.

5. The method of claim 1, wherein the first, wireless coupling is a WLAN coupling.

6. The method of claim 1, wherein the first, wireless coupling is a GSM coupling.

7. The method of claim 1, wherein the first, wireless coupling is an optical coupling.

8. A non-transitory computer readable storage medium storing instructions that, when executed by a processor, cause the processor to perform the method including:
   detecting a device within communication range of a wireless vehicle-based transceiver;
   establishing communication with the device over a first, wireless coupling;
   requesting identification verification from the device over the first coupling;
   receiving identification verification from the device over a second capacitive coupling responsive to the requesting; and
   utilizing the identification verification to select the device for establishment of bi-directional communication over the first coupling.

9. The computer readable storage medium of claim 8, wherein:
   the detecting a device includes detecting a plurality of devices, wherein
   the establishing communication includes establishing communication with the plurality of devices, wherein
   the requesting identification includes requesting identification from the plurality of devices, wherein
   the receiving identification includes receiving identification from one of the plurality of devices over the second coupling, and wherein
   the utilizing the identification includes utilizing the identification to select the one of the plurality of devices for establishment of bi-directional communication over the first coupling.

10. The computer readable storage medium of claim 8, wherein the first, wireless coupling is a BLUETOOTH coupling.

11. The non-tangible computer readable storage medium of claim 8, wherein: the detecting a device includes detecting a plurality of devices, wherein the establishing communication includes establishing communication with the plurality of devices, wherein the requesting identification includes requesting identification from the plurality of devices, wherein the receiving identification includes receiving identification from one of the plurality of devices over the second coupling, and wherein the utilizing the identification includes utilizing the identification to select the one of the plurality of devices for establishment of bi-directional communication over the first coupling.

12. The non-tangible computer readable storage medium of claim 8, wherein the first, wireless coupling is a BLUETOOTH coupling.

13. The non-tangible computer readable storage medium of claim 8, wherein the first, wireless coupling is a WiFi coupling.

14. The non-tangible computer readable storage medium of claim 8, wherein the first, wireless coupling is a WLAN coupling.

15. The non-tangible computer readable storage medium of claim 8, wherein the first, wireless coupling is a GSM coupling.

16. The non-tangible computer readable storage medium of claim 8, wherein the first, wireless coupling is an optical coupling.

17. The system of claim 15, wherein the second, wireless coupling is a WiFi coupling.

18. The system of claim 15, wherein the second, wireless coupling is a WLAN coupling.

19. The system of claim 15, wherein the second, wireless coupling is a GSM coupling.

20. The system of claim 15, wherein the second, wireless coupling is an optical coupling.

* * * * *